March 6, 1928.
H. PIEPER
1,661,624
SERVO BRAKE
Filed April 15, 1926
3 Sheets-Sheet 1
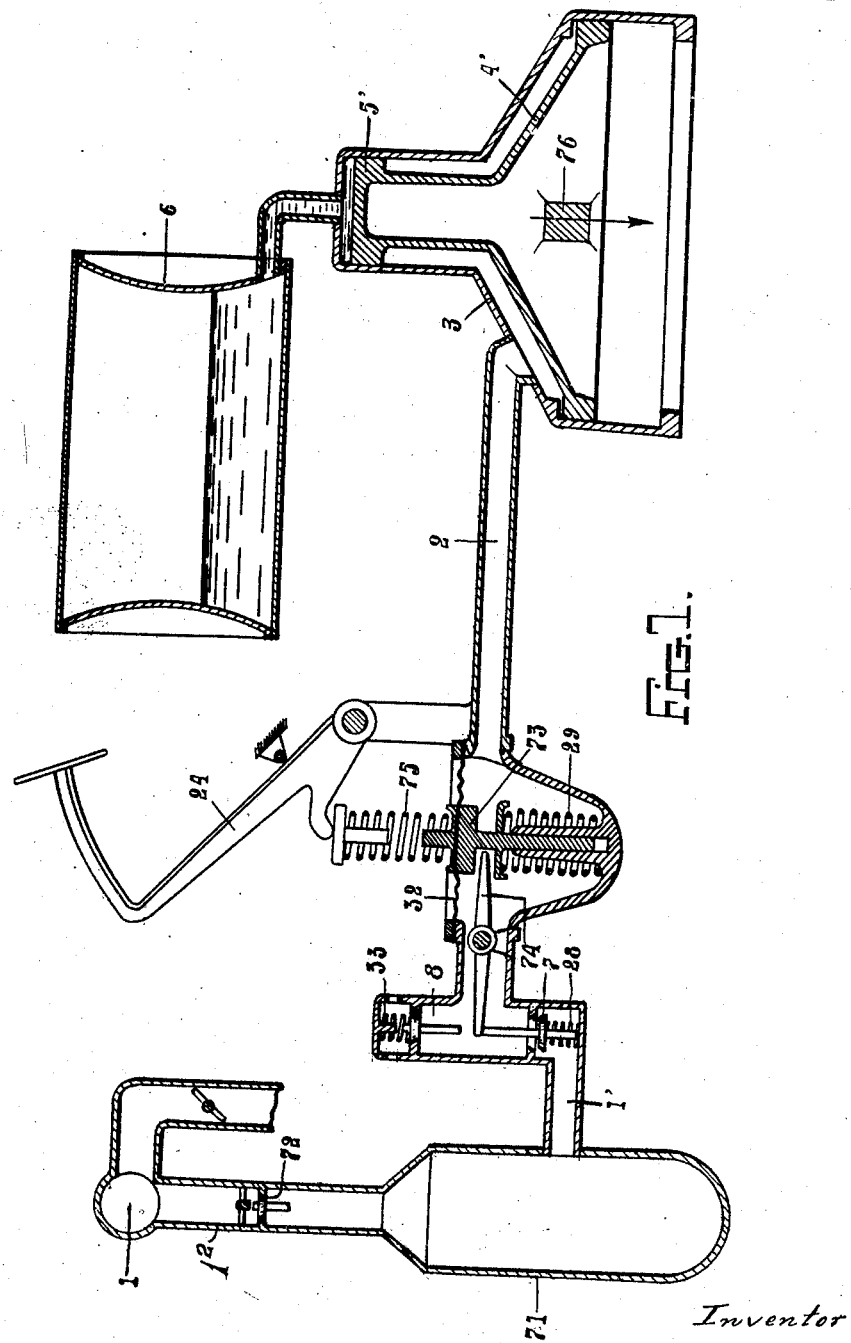
Inventor
Henri Pieper
By [signature]
Attorney March 6, 1928.
H. PIEPER
SERVO BRAKE
Filed April 15, 1926
1,661,624
3 Sheets-Sheet 2
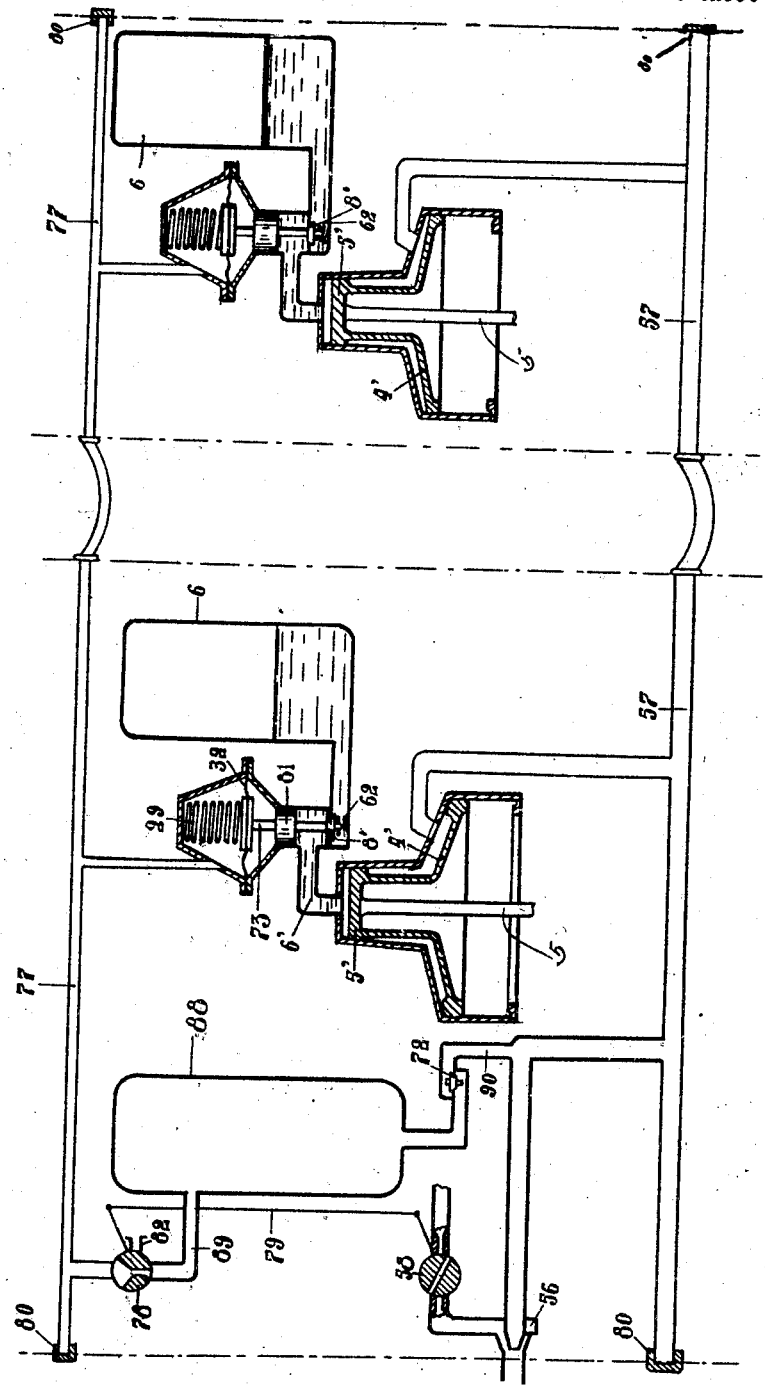
Inventor:
Henri Pieper
By
Attorney

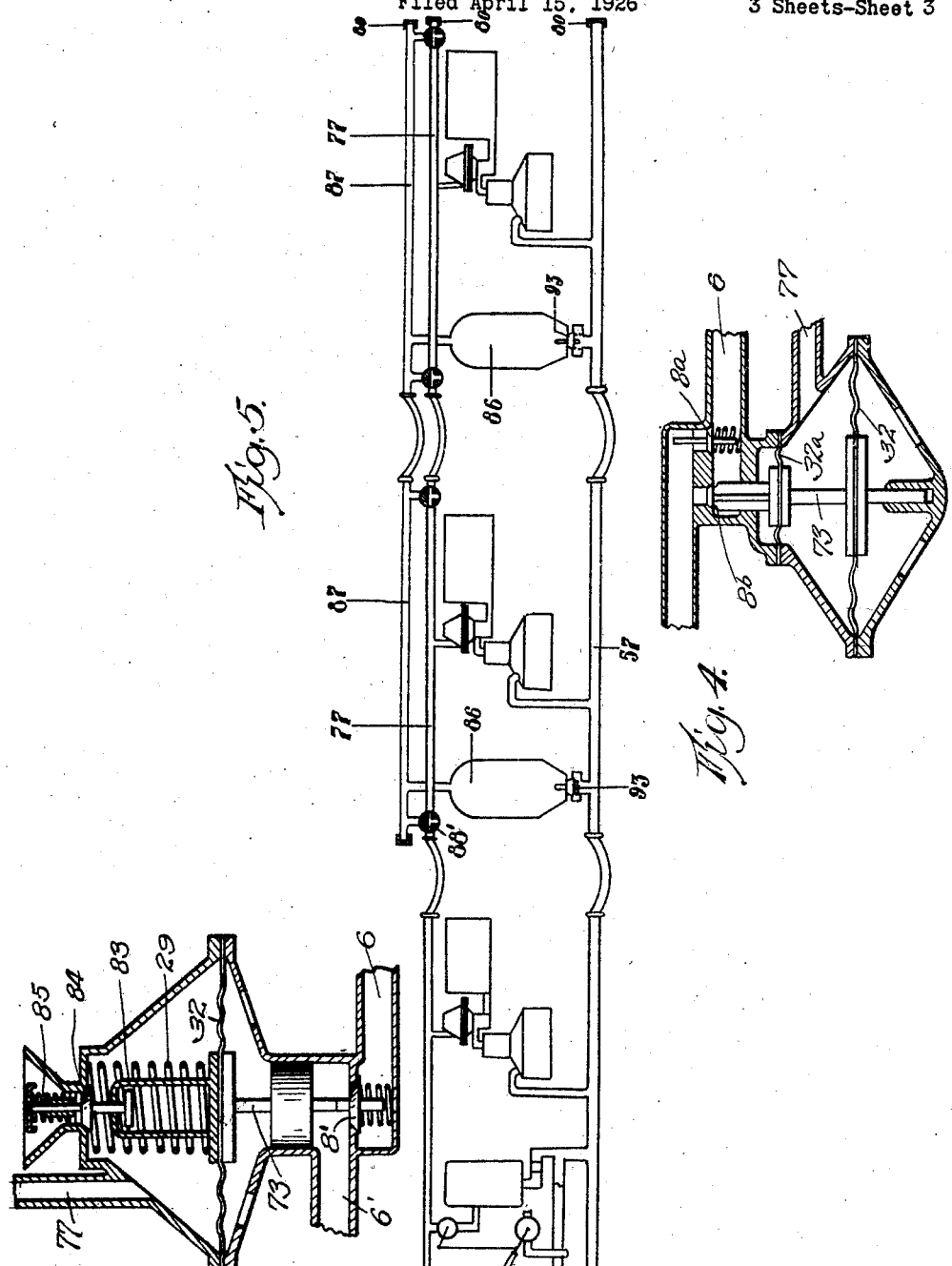

Patented Mar. 6, 1928.

1,661,624

UNITED STATES PATENT OFFICE.

HENRI PIEPER, OF BRUSSELS, BELGIUM, ASSIGNOR TO COMPAGNIE INTERNATIONALE DES FREINS AUTOMATIQUES, SOCIETE ANONYME, OF LIEGE, BELGIUM.

SERVO-BRAKE.

Application filed April 15, 1926, Serial No. 102,183, and in Belgium December 24, 1925.

The servo brake system described in the application No. 757,747 is adapted for use on vehicles provided with an internal combustion engine. The suction of this engine is employed in order to release the brakes which are applied by mechanical, hydraulic or pneumatic means.

In vehicles of this description it frequently occurs that immediately after the pedal which controls the application of the brakes has been released, the accelerator establishing the admission of the explosive mixture to the engine is actuated with a view to accelerate the speed of the vehicle. It may happen therefore that in certain cases this admission which produces a decrease in the partial vacuum existing in the suction duct of the engine takes place before the partial vacuum which previously existed in the duct has had time to effect the complete release of the brakes.

The present invention has for its object to obviate this disadvantage. With this end in view the invention involves the use of a vessel in which the suction of the engine produces a partial vacuum during the periods when the partial vacuum which exists in the suction duct is fairly high.

An automatic valve is interposed between the said vessel and the suction duct in such a way that it becomes pressed upon its seating as soon as the partial vacuum existing in the suction duct falls. The duct transmitting the partial vacuum to the brake releasing cylinder communicates with this vessel in such a way that release may be obtained whatever be the partial vacuum produced at the moment under consideration by the engine.

The invention further relates to a particular advantageous construction of the distributor controlling the entry into action of the brake applying and releasing devices.

This distributor, which comprises a sliding member, actuates in one direction the closing member controlling communication with the atmosphere and in the other that controlling communication with the partial vacuum. This sliding member is attached to a diaphragm subjected upon one of its surfaces to the action of atmosphere pressure and upon the other to the action of the partial vacuum existing in the releasing cylinder. The said member may further be subjected to the pressure of a spring opposing the action of the atmospheric pressure and may be connected to the brake controlling pedal or lever through the intermediary of another spring.

The above said patent application describes a servo brake in which the braking force is produced by employing, for the application of the brakes, a reserve of energy placed upon each vehicle, release being obtained by causing a partial vacuum produced upon one of them to act upon pistons connected to the brake mechanism of each vehicle, which partial vacuum is produced in one of the latter and transmitted throughout the whole length of the train.

The present improvement involves an arrangement according to which the entry into action of a brake applying and releasing means disposed upon each vehicle is controlled upon each one of the latter by a distributor itself controlled by the pressure of a fluid contained in a second duct extending throughout the whole length of the train.

The said distributor will be maintained in the position corresponding to release when a partial vacuum exists in the said controlling duct. The latter may be put into communication with a vessel in which exists a partial vacuum produced by the device which produces the partial vacuum necessary for the release of the brakes.

With a view to speeding up the application of the brakes throughout the whole length of the train the above mentioned distributor may cause the said controlling duct to be put into communication with the atmosphere upon the vehicle where the said distributor is located and this will be effected when one of the members of the distributor has completed a stroke in the direction for the application of the brakes exceeding a certain length.

The invention also provides for the use of an additional vessel in which a partial vacuum exists, such vessel to be disposed upon certain vehicles with a view to allowing the brakes to be released without the assistance of the vehicle provided with the device producing the partial vacuum which is transmitted throughout the whole length of the train.

The said additional vessel may also be mounted upon an additional duct extending over the whole length of the train, the tapping being made from the vehicle producing the partial vacuum.

The accompanying drawing illustrates by way of example some forms of the invention.

In this drawing:

Figure 1 shows diagrammatically one form of the invention in the case of a vehicle provided with an internal combustion engine.

Figure 2 illustrates diagrammatically the members carried by the vehicle provided with the device producing the partial vacuum as well as the member carried by one of the other vehicles.

Figures 3 and 4 show modified forms of one of these members.

Figure 5 is a view similar to Fig. 2 in the case of the employment of a releasing vessel disposed upon certain vehicles.

In the case shown in Figure 1 the brake mechanism (not shown) will be connected to differential pistons 4', 5' for example through the medium of the cross member 76. The piston 5' is moved towards the position for application of the brakes by the action of a fluid under pressure contained in the vessel 6. Release is produced by communicating a partial vacuum through the duct 2 into the releasing cylinder 3 in which moves the piston 4'. The duct 2 is connected through the interposition of a distributor, which is more particularly described hereinafter, to the suction duct 1 of the engine.

This connection is effected through the medium of a duct 1' opening into a vessel 71 and a second duct 1² leading from said vessel to the suction duct 1; such connection being controlled by means of an automatic valve 72 which is located in the duct 1² and which opens in an upward direction, returning upon its seat as soon as the partial vacuum in duct 1 becomes less than that which exists in the said vessel 71.

It will be apparent that this vessel may be omitted, on condition that a duct is provided which connects the automatic valve 72 and a valve 7 associated with the previously-mentioned distributor; the capacity of such duct being equal to that of the vessel.

A characteristic feature of the invention consists in the use of an automatic valve such as 72 interposed between the suction duct 1 and the vessel or reservoir 71; such valve opening only when the suction in said duct 1 is greater than that in said vessel, and thereby permitting sufficient suction for the operation of the brakes to be maintained while the engine is running.

The distributor comprises a sliding member 73 which, when it is moved upwards as shown in Figure 1, opens the valve 7 controlling communication with the partial vacuum in vessel 71. This valve 7 is constantly pressed towards its seating by a spring 28. When the member 73 is moved downward, it permits the valve 7 to close and opens the valve 8 that controls communication with the atmosphere, which valve 8 is constantly pressed towards its seating by a spring 33.

These opening movements are produced through the medium of a rocking lever 74 adapted to bear upon the spindles of the valves and to operate through the said sliding member 73.

The latter is secured to a diaphragm 33, one of the surfaces of which is subjected to atmospheric pressure while the other surface is acted upon by the pressure existing in the releasing cylinder 3 and transmitted through the duct 2. The sliding member is also subjected to the action of a spring 29 which tends to move it upward and it is connected to the controlling pedal 24 through the medium of a spring 75.

The position of the parts shown in Figure 1 corresponds to release of the brakes. If the pedal 24 is moved in an anti-clockwise direction the sliding member 73 will move a little downwards so as to first enable the valve 7 to return upon its seating and then to raise the valve 8 which allows air to enter into the duct 2 and into the releasing cylinder 3. As a consequence the differential pistons 4', 5' are acted upon by the fluid under pressure contained in the vessel 6 and move downwards as seen in the figure in such a way as to displace the brake mechanism in the direction for the application of the brakes.

As a result of this admission of air the partial vacuum decreases in the releasing cylinder 3 and in the duct 2 the effect of which is to produce an upward displacement of the sliding member 73 as a consequence of the difference in pressures which the diaphragm 32 undergoes on account of the reduction in partial vacuum.

The valve 8 returns to its seat and the brakes are applied with a pressure which depends upon the difference between the pressures existing on the one hand in the vessel 6 and on the other hand in the releasing cylinder 3. A fresh displacement of the pedal 24 in the said direction will allow a new admission of air to take place which will correspond to an increase in the braking pressure.

It is to be noted that the spring 75 becomes compressed to a greater extent in proportion as the pressure increases in the releasing cylinder 3. Upon the return of the pedal in the opposite direction the brakes will be released by operations which are the reverse of those which take place for the application of the brakes.

In the case shown in Figure 2 the brake mechanism of each vehicle is connected to the rod 5 of a piston 5' which is displaced in the direction for application of the brakes by a fluid under pressure coming from vessel 6, the flow of which fluid is controlled by a valve 8' provided with a return spring 62 and being raised automatically when the piston 5' is constrained to move in the direction corresponding to release. This displacement is obtained by the intervention of a partial vacuum acting upon a piston 4' connected to the said piston 5. This partial vacuum is transmitted throughout the whole length of the train by a duct 57 closed at both ends of the train by plugs 80 and connected to a device producing partial vacuum, formed for example by an ejector 56 supplied by means of steam, the flow of which is controlled by a cock 58.

The control of the valves 8' of the different vehicles is obtained by means of a distributor provided upon each of the latter and comprising a sliding member 73 adapted to act upon the said valve. This member is connected to a diaphragm 32 upon one of the faces of which acts the partial vacuum existing in a control duct 77 extending through the whole length of the train.

The said sliding member is also subjected, through the medium of a piston 81, to the action of the pressure existing in the brake cylinder 6' as well as the pressure of a spring 29 acting in opposition to the partial vacuum.

When a partial vacuum exists in the duct 77 the diaphragms 32 of the various distributors are raised as well as the sliding members 73 so that the valves 8' remain upon their seats, which prevents any displacement of the pistons 5' in the direction for application of the brakes.

The partial vacuum existing in the duct 77 is controlled by means of a cock 78 adapted to connect this duct 77 either with the atmosphere through opening 82 or with a source of partial vacuum through a duct 89. This duct 89 opens into a vessel 88 in which exists a partial vacuum produced by the ejector 56. This vessel is in fact connected to the duct 57 by a duct or train pipe 90 in which is interposed an automatic valve 72 which opens when the partial vacuum existing in the said duct 57 is greater than that which exists in the vessel 88.

In order to obtain the control of the cocks 58 and 78 by the actuation of a single lever, these cocks are connected together by a rod 79.

It will be seen that the application of the brakes will be obtained by allowing air to enter the control duct 77.

It is to be noted that if a cock is provided upon the duct 77 between the vehicle provided with the device producing the partial vacuum and the vehicle coupled to it, it will be possible, by closing this cock before uncoupling the first of the vehicles mentioned above, to maintain the brakes of the others in the released position.

With a view to speeding up the braking and in particular the braking of vehicles which are comparatively distant from the end of the duct 77 through which atmospheric air enters, the distributors of certain vehicles may be provided with a device producing a direct communication for these vehicles between the duct 77 and the atmosphere when the sliding member 73 which they comprise has completed in the direction for the application of the brakes a stroke exceeding a certain length.

For this purpose provision may be made for the said sliding member 73 to actuate, after it has made a certain displacement, a valve 84 communicating with the atmosphere.

In the case shown in Figure 3 this valve is constantly acted upon by a spring 85 in such a way as to keep it pressed upon its seat. It is adapted to be positively opened by a bridge piece 83 secured to the sliding member 73.

Figure 4 shows that the valve 8 of the distributors may be replaced on the one hand by an automatic valve $8^a$ and on the other hand by a valve $8^b$ secured to the sliding member 73.

The spring 29 shown in Figures 2 and 3 is dispensed with and its action is obtained by a second diaphragm $32^a$ attached to the sliding member 73 and acted upon one side by the pressure of the vessel 6 and upon the other by the partial vacuum of the control duct 77.

The movements of the said diaphragm $32^a$ are affected by the variations in pressure in the vessel 6.

Figure 5 relates to an arrangement which enables the brakes of one set of vehicles to be maintained in released position while the vehicle provided with the device producing the partial vacuum, for example the locomotive, is detached from this set, and this in spite of the small admissions of air which may be produced.

For this purpose vessels 86 are provided upon certain of the vehicles, in which vessels a partial vacuum is produced for example by means of the partial vacuum which exists when the releases take place in the duct 57; automatic valves 93 being interposed between the vessels 86 and the said duct 57.

The vessels 86 are mounted on an additional duct 87 which extends throughout the whole length of the train, the lead being taken form the locomotive. This duct 87 is connected from place to place with the control duct 77 by closing members or cocks 88' the position of which is shown in Figure 5.

If it is desired to maintain the brakes in their position of release, it is sufficient to displace one of these closing members 88' in such a way that it establishes communication between the partial vacuum duct 87 and the control duct 77, this being effected before the said duct 77 is detached from the locomotive, the two ducts 77 and 87 being thus cut off from the atmosphere.

From this moment the brakes will be maintained in their position of release even after atmospheric pressure is re-established in the releasing duct 57. The brakes may be brought back into their applied position if air is made to enter the control duct 57, for then the sliding members 73 of the distributors will separate the valves 8' positively from their seats.

It is to be noted that the partial vacuum existing in the vessels 86 may be employed for providing the energy necessary for release when a vehicle is uncoupled.

It goes without saying that the control duct 77 may act upon the distributors, which will consequently be modified, by means of compressed air instead of rarefied air.

In this case the vessels 86 shown in Figure 5 will also contain compressed air which may be charged by the control duct 77 with the interposition of an automatic valve.

Finally, it is obvious that the various devices described for producing the control may be employed in combination with any means producing the release of the brakes, for example electromagnetic means.

What I claim is:

1. In a servo brake, provided with brake mechanism, a piston connected to the brake mechanism and moving in a releasing cylinder, a controllable communication between said cylinder and a partial vacuum source, and a vessel arranged in said communication and in which a partial vacuum is maintained.

2. In a servo brake provided with brake mechanism, a piston connected to the brake mechanism and moving in a releasing cylinder, a controllable communication between said cylinder and a partial vacuum source, a vessel arranged in said communication and an automatic valve interposed between the said vessel and the partial vacuum source.

3. In a servo brake provided with brake mechanism, a piston connected to the brake mechanism and moving in a releasing cylinder, a controllable communication duct between said releasing cylinder and the suction duct of a combustion engine, and a distributor controlling the entry into action of the releasing means the part of said communication duct connecting the releasing comprised between the engine and the distributor having an enlargement.

4. In a servo brake provided with brake mechanism, a piston connected to the brake mechanism and moving in a releasing cylinder, a controllable communication duct between said cylinder and a partial vacuum source, a vessel in which a partial vacuum is maintained, and a distributor controlling the entry into action of the releasing devices, said distributor comprising a sliding member movable in one direction to actuate a closing member controlling communication with the atmosphere, and in the other direction to actuate a closing member controlling communication with the duct connected to the partial vacuum source, said sliding member being connected to a diaphragm subjected upon one side to atmospheric pressure and upon the other side to the partial vacuum existing in the releasing cylinder, the displacements of the said sliding member being controlled by the brake controlling pedal or lever.

5. In a servo brake provided with brake mechanism, a piston connected to the brake mechanism and moving in a releasing cylinder, a controllable communication duct between said cylinder and a partial vacuum source, a vessel in which a partial vacuum is maintained, and a distributor controlling the entry into action of the releasing devices, said distributor comprising a sliding member movable in one direction to actuate a closing member controlling communication with the atmosphere, and in the other direction to actuate a closing member controlling communication with the duct connected to the partial vacuum source, said sliding member being connected to a diaphragm subjected upon one side to atmospheric pressure and upon the other side to the partial vacuum existing in the releasing cylinder, the displacements of the said sliding member being controlled by the brake controlling pedal or lever, the said sliding member being further subjected to the action of a spring exerting an action which opposes the action of atmospheric pressure.

6. In a servo brake provided with brake mechanism, a piston connected to the brake mechanism and moving in a releasing cylinder, a controllable communication duct between said cylinder and a partial vacuum source, a vessel in which a partial vacuum is maintained, and a distributor controlling the entry into action of the releasing devices, said distributor comprising a sliding member movable in one direction to actuate a closing member controlling communication with the atmosphere, and in the other direction to actuate a closing member controlling communication with the duct connected to the partial vacuum source, said sliding member being connected to a diaphragm subjected upon one side to atmospheric pressure and upon the other side to the partial vacuum existing in the releasing cylinder, the displacements of the said sliding member being controlled by the brake controlling pedal or lever with the interposition of a spring.

7. In a servo brake provided with brake mechanism, a piston connected to the brake mechanism and moving in a releasing cylinder, a controllable communication between said cylinder and a partial vacuum source, a vessel in which a partial vacuum is maintained, and a distributor comprising a sliding member acting by means of a rocking lever upon closing members which are formed by two valves drawn towards their seats by springs.

8. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member and a duct in which a partial vacuum is created for operating said distributor.

9. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member and a duct in which a partial vacuum is created for operating said distributor the latter being maintained in the position corresponding to release when a partial vacuum exists in the said control duct which may be put into communication with a vessel in which exists a partial vacuum produced by the device which produces the partial vacuum necessary for releasing the brakes.

10. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member and a duct in which a partial vacuum is created for operating said distributor, the latter being maintained in the position corresponding to release when a partial vacuum exists in the said control duct which may be put into communication with a vessel in which exists a partial vacuum produced by the device which produces the partial vacuum necessary for releasing the brakes, a kinematic connection being provided between the mechanism producing the partial vacuum and a closing member controlling the communication with the said vessel.

11. In a servo brake provided with brake mechanism, a piston connected to the rodding and moving in a releasing cylinder, a controllable communication between said cylinder and a partial vacuum source, a vessel in which a partial vacuum is maintained, a distributor controlling the entry into action of the releasing member and a duct in which a partial vacuum is created for operating said distributor, the latter being maintained in the position corresponding to release when a partial vacuum exists in the said control duct which may be put into communication with a vessel in which exists a partial vacuum produced by the device which produces the partial vacuum necessary for releasing the brakes, a kinematic connection being provided between the mechanism producing the partial vacuum and a closing member controlling the communication with the said vessel, said closing member enabling the said control duct to be put into communication with the atmosphere.

12. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member and a duct in which a partial vacuum is created for operating said distributor; the said distributor comprising a sliding member connected to a diaphragm upon one side of which acts the partial vacuum existing in the said control duct, the sliding member undergoing the action of the pressure existing in the brake cylinder and which is also in opposition to a spring constantly pressing the said member in one direction, which produces the distribution by acting upon a closing member interposed in a duct connecting the brake cylinder to a vessel containing a fluid under pressure.

13. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member, a duct in which a partial vacuum is created for operating said distributor; the said distributor comprising a sliding member connected to a diaphragm upon one side of which acts the partial vacuum existing in the said control duct, the sliding member undergoing the action of the pressure existing in the brake cylinder and which is also in opposition to a spring constantly pressing the said member in one direction, which produces the distribution by acting upon a closing member interposed in a duct connecting the brake cylinder to a vessel containing a fluid under pressure; means being provided for enabling said distributor to produce communication between the control duct and the atmosphere when the said sliding member has completed a stroke exceeding a certain length in the direction corresponding to release of the brakes.

14. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member and a duct in which a partial vacuum is created for operating said distributor; an additional vessel in which exists a partial vacuum being disposed upon certain vehicles with a view to permitting the brakes to be released without the assistance of the vehicle provided with the device producing the partial vacuum which is transmitted throughout the whole length of the train.

15. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member, a duct in which a partial vacuum is created for operating said distributor; an additional vessel in which exists a partial vacuum being disposed upon certain vehicles with a view to permitting the brakes to be released without the assistance of the vehicle provided with the device producing the partial vacuum which is transmitted throughout the whole length of the train, said additional vessel being mounted upon an additional duct extending throughout the whole length of the train, the lead being taken from the vehicle provided with the device producing the partial vacuum.

16. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member and a duct in which a partial vacuum is created for operating said distributor; an additional vessel in which exists a partial vacuum being disposed upon certain vehicles with a view to permitting the brakes to be released without the assistance of the vehicle provided with the device producing the partial vacuum which is transmitted throughout the whole length of the train, said additional vessel being mounted upon an additional duct extending throughout the whole length of the train, the lead being taken from the vehicle provided with the device producing the partial vacuum, a closing arrangement allowing the control duct to be made to communicate either with the said additional duct or with the atmosphere.

17. In a servo brake provided with brake mechanism, a piston connected to the brake mechanism and moving in a releasing cylinder, a controllable communication between said cylinder and a partial vacuum source, a vessel in which a partial vacuum is maintained, a distributor controlling the entry into action of the releasing member, a duct in which a partial vacuum is created for operating said distributor; an additional vessel in which exists a partial vacuum being disposed upon certain vehicles with a view to permitting the brakes to be released without the assistance of the vehicle provided with the device producing the partial vacuum which is transmitted throughout the whole length of the train, a duct provided with an automatic valve being interposed between the said vessel and the duct transmitting the partial vacuum which produces the release of the brakes.

18. A servo brake adapted for use upon a train of vehicles in which the braking is obtained by employing, for the application of the brakes, a reserve of energy placed upon each vehicle, release being obtained by means controlled from one of the vehicles by means of variations in pressure transmitted through a control duct extending throughout the whole length of the train, each vehicle comprising a vessel charged by the said control duct and adapted to be employed for producing the release of the brakes of this vehicle when it is separated from the others.

In testimony whereof I affix my signature.

HENRI PIEPER.